United States Patent
Parameswaran et al.

(10) Patent No.: US 11,461,881 B2
(45) Date of Patent: Oct. 4, 2022

(54) METHOD FOR RESTORING IMAGES AND VIDEO USING SELF-SUPERVISED LEARNING

(71) Applicant: United States Government as represented by the Secretary of the Navy, San Diego, CA (US)

(72) Inventors: Shibin Parameswaran, San Diego, CA (US); Martin Thomas Jaszewski, San Diego, CA (US)

(73) Assignee: United States of America as represented by the Secretary of the Navy, Washington, DC (US)

( * ) Notice: Subject to any disclaimer, the term of this patent is extended or adjusted under 35 U.S.C. 154(b) by 65 days.

(21) Appl. No.: 17/105,135

(22) Filed: Nov. 25, 2020

(65) Prior Publication Data
US 2022/0164933 A1  May 26, 2022

(51) Int. Cl.
*G06T 5/50* (2006.01)
(52) U.S. Cl.
CPC ...... *G06T 5/50* (2013.01); *G06T 2207/20081* (2013.01); *G06T 2207/20084* (2013.01)
(58) Field of Classification Search
CPC ............. G06T 5/50; G06T 2207/20081; G06T 2207/20084
See application file for complete search history.

(56) References Cited

U.S. PATENT DOCUMENTS

| | | | |
|---|---|---|---|
| 10,410,090 B1* | 9/2019 | Wilczynski | G06K 9/6257 |
| 2018/0357753 A1* | 12/2018 | Lehtinen | G06N 3/0454 |
| 2020/0005422 A1* | 1/2020 | Subramanian | B25J 9/1697 |
| 2020/0019765 A1* | 1/2020 | Ampatzidis | G06N 3/08 |
| 2020/0234080 A1* | 7/2020 | Ciller Ruiz | G06T 11/008 |
| 2020/0286208 A1* | 9/2020 | Halupka | G06N 3/088 |
| 2020/0372284 A1* | 11/2020 | Rhemann | G06K 9/6273 |
| 2020/0393909 A1* | 12/2020 | Parland | G06V 40/20 |
| 2021/0073637 A1* | 3/2021 | Witzgall | G06F 16/55 |
| 2021/0145393 A1* | 5/2021 | Gao | A61B 6/5258 |

(Continued)

OTHER PUBLICATIONS

Ulyanov, D., et al., "Deep Image Prior", International Journal of Computer Vision, vol. 128, pp. 1867-1888, Mar. 2020.*

(Continued)

*Primary Examiner* — Xuemei G Chen
(74) *Attorney, Agent, or Firm* — Naval Information Warfare Center Pacific; Kyle Eppele; J. Eric Anderson

(57) ABSTRACT

A method for processing images comprising: capturing a plurality of degraded images of a first real-world environment with a first sensor; processing each degraded image with a first, untrained convolutional neural network, via a Deep Image Prior approach, to obtain a plurality of clean images, wherein each clean image corresponds to a degraded image; pairing each clean image with its corresponding degraded image to create a plurality of degraded/clean image pairs; training, via a supervised learning approach, a machine learning model to learn a function for converting degraded images into restored images based on the plurality of degraded/clean image pairs; capturing a second plurality of degraded images of a second real-world environment; and using the trained machine learning model to convert the second plurality of degraded images into restored images based on the learned function.

20 Claims, 3 Drawing Sheets

(56) References Cited

U.S. PATENT DOCUMENTS

2021/0264282 A1\* 8/2021 Collomosse .......... G06N 3/084
2021/0269174 A1\* 9/2021 Shuff .................. G08G 5/0069

OTHER PUBLICATIONS

Ulyanov, D. et al.; Deep Image Prior; Int J Comput Vis 128, 1867-1888, 2020.
Lehtinen, J. et al.; Noise2Noise: Learning Image Restoration without Clean Data; Proceedings of the 35th International Conference on Machine Learning, Stockholm, Sweden, PMLR 80, 2018.

\* cited by examiner

METHOD FOR RESTORING IMAGES AND VIDEO USING SELF-SUPERVISED LEARNING

FEDERALLY-SPONSORED RESEARCH AND DEVELOPMENT

The United States Government has ownership rights in this invention. Licensing and technical inquiries may be directed to the Office of Research and Technical Applications, Naval Information Warfare Center Pacific, Code 72120, San Diego, Calif., 92152; voice (619) 553-5118; ssc_pac_t2@navy.mil. Reference Navy Case Number 112547.

BACKGROUND OF THE INVENTION

Neural networks and other machine learning methods have been successfully used to restore and enhance images, but their success depends on the ability to train them with a large number (in the order of millions) of data pairs of degraded and clean images. Obtaining such a coupled dataset with clean-degraded image pairs is extremely difficult for real-world scenarios that might include, but are not limited to, complex scenes, a moving camera, dynamic objects, and ever-changing lighting and weather conditions.

SUMMARY

Described herein is a method for processing images that comprises, consists of, or consists essentially of the following steps. The first step provides for capturing a plurality of degraded images of a real-world environment with a first sensor. The next step provides for processing each degraded image with an untrained convolutional neural network, via a Deep Image Prior approach, to obtain a plurality of clean images, wherein each clean image corresponds to a degraded image. The next step provides for pairing each clean image with its corresponding degraded image to create a plurality of degraded/clean image pairs. The next step provides for training, via a supervised learning approach, a machine learning model to learn a function for converting degraded images into restored images based on the plurality of degraded/clean image pairs. The next step provides for using a second sensor to capture a second plurality of degraded images of a second real-world environment. The next step provides for using the trained machine learning model to convert the second plurality of degraded images into restored images based on the learned function.

The image processing method described herein may be used to process images in real time on a system comprising a first sensor and first and second computer processors. The first sensor is configured to capture a plurality of degraded images of a real-world environment. The first computer processor is communicatively coupled to the first sensor and comprises a convolutional neural network configured to process each of the degraded images, via a Deep Image Prior approach, to obtain a plurality of clean images. Each clean image corresponds to a degraded image, such that each clean image is paired with its corresponding degraded image to create a plurality of degraded/clean image pairs. The second computer processor comprises a machine learning model that has been trained, via a supervised learning approach, to learn a function for converting degraded images into restored images based on the plurality of degraded/clean image pairs. The first sensor is communicatively coupled to the second computer processor and configured to capture a second plurality of degraded images of a second real-world environment. The machine learning model is configured to convert the second plurality of degraded images into restored images based on the learned function.

BRIEF DESCRIPTION OF THE DRAWINGS

Throughout the several views, like elements are referenced using like references. The elements in the figures are not drawn to scale and some dimensions are exaggerated for clarity.

DETAILED DESCRIPTION OF EMBODIMENTS

The disclosed methods and systems below may be described generally, as well as in terms of specific examples and/or specific embodiments. For instances where references are made to detailed examples and/or embodiments, it should be appreciated that any of the underlying principles described are not to be limited to a single embodiment, but may be expanded for use with any of the other methods and systems described herein as will be understood by one of ordinary skill in the art unless otherwise stated specifically.

Figure 1:
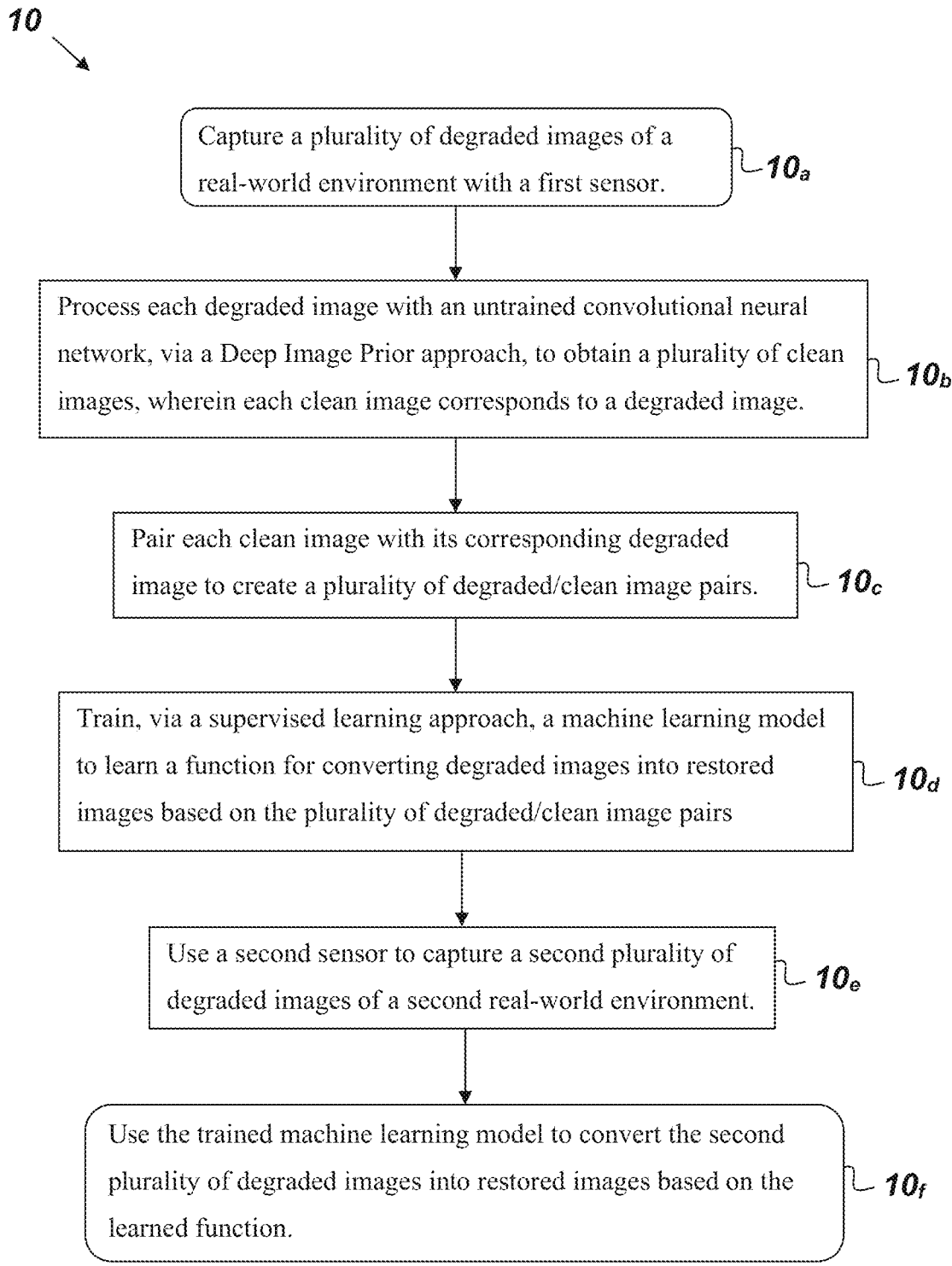
FIG. 1 is a flowchart of an image processing method.

FIG. 1 is a flowchart of a method 10 for processing images that comprises, consists of, or consists essentially of the following steps. The first step $10_a$ provides for capturing a plurality of degraded images of a real-world environment with a first sensor. The next step $10_b$ provides for processing each degraded image with an untrained convolutional neural network, via a Deep Image Prior approach, to obtain a plurality of clean images, wherein each clean image corresponds to a degraded image. The next step $10_c$ provides for pairing each clean image with its corresponding degraded image to create a plurality of degraded/clean image pairs. The next step $10_d$ provides for training, via a supervised learning approach, a machine learning model to learn a function for converting degraded images into restored images based on the plurality of degraded/clean image pairs. The next step $10_e$ provides for using a second sensor to capture a second plurality of degraded images of a second real-world environment. The next step $10_f$ provides for using the trained machine learning model to convert the second plurality of degraded images into restored images based on the learned function.

Machine learning algorithms perform tasks by finding patterns in data. The supervised learning approach splits the task into a training phase where the algorithm learns from examples and builds a model and an inference phase in which the algorithm makes predictions from new data. For tasks involving image and video content, a class of machine learning algorithms called convolutional neural networks (ConvNets) may be used. ConvNets may be used to obtain state-of-the-art results in image enhancement and restoration applications. Specifically, the ConvNets can be used to learn a restoration (or enhancement) function and used to produce a restored or enhanced image (or video) from a degraded input image (or video). To accomplish this, the ConvNets may be trained with a large number of carefully curated pairs of degraded and clean images, via the supervised learning approach, to learn a function (model) which maps between the two.

Figure 2:
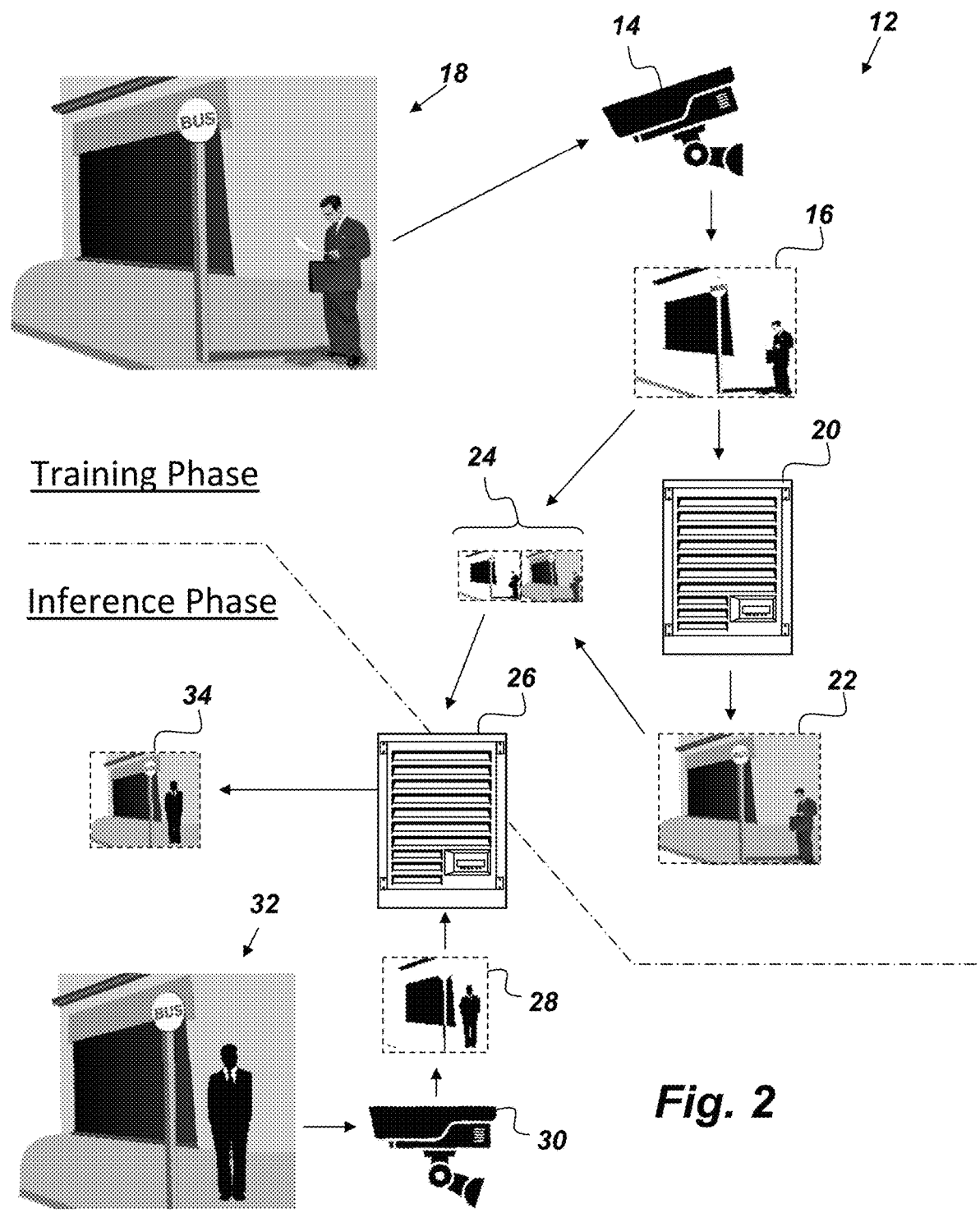
FIG. 2 is an illustration of an image processing system.

FIG. 2 is an illustration of an example image processing system 12 that may be used to practice the image processing method 10. System 12 comprises a first sensor 14 that is configured to capture degraded images 16 of a real-world environment 18. The first sensor 14 is communicatively coupled to a first computer processor 20, which is programmed with an untrained ConvNet. The degradation of the degraded images 16 may be due to many different factors or combination of factors including, but not limited to, fog, smoke, poor lighting, dirty lens, sensor degradation, electromagnetic interference, etc. The untrained ConvNet, as described in more detail below, is configured to process the degraded image 16, via a Deep Image Prior approach, to obtain clean images 22. Each of the clean images 22 and its corresponding degraded image 16 form a plurality of degraded/clean image pairs 24, which are used to train, via a supervised learning approach, a machine learning model 26, which is stored on a second computer processor. Once trained, the trained machine learning model 26 may be used to convert degraded images 28 from a second sensor 30 of a second real-world environment 32 into restored images 34. The second sensor 30 may or may not be the same as the first sensor 14. Depending on the application, the trained machine learning model 26 may be configured to convert the degraded images 28 into restored images 34 in real time. As used herein, the phrase "real time" may be interpreted as taking place in less than 20 milliseconds.

The Deep Image Prior approach addresses image restoration problems by using an untrained network to restore a single image. The restored outputs from this approach are of good quality, but the approach is inefficient and unsuitable for real-time applications where low latency and high throughput are important (e.g., processing video streams) or hardware capabilities are limited. The Deep Image Prior approach is explained in the paper "Deep Image Prior" by Ulyanov, D., Vedaldi, A. & Lempitsky, V., arXiv: 1711.10925 [cs.CV] 17 May 2020, which is incorporated by reference herein in its entirety. The Deep Image Prior approach may be described as comprising the following steps. The first step provides for initializing an untrained ConvNet with random weights. The next step provides for using the untrained ConvNet's structure as an image prior. The next step provides for performing denoising, super-resolution, and/or inpainting operations on the given degraded image based only on the image prior without any other input or training. In one embodiment, the untrained ConvNet may be initialized with a combination of learned weights and random weights to enhance a given degraded image. The Deep Image Prior approach may be mathematically characterized as follows:

$$\theta^* = \mathrm{argmin} E(f_\theta(z); x_0), \; x^* = f_{\theta^*}(z) \tag{1}$$

where f is a learned function, θ is a random initialization of network parameters, θ* is a local minimizer obtained using gradient descent, $E(f_\theta(z); x_0)$ is a task-specific data term, $x_0$ is a given degraded image; x* is a corresponding restored image, and z is a randomly-initialized three-dimensional tensor.

The first sensor 14 may be any imaging apparatus capable of creating a digital representation of a real-world environment. Suitable examples of the first sensor 14 include, but are not limited to, a still image camera, a sonar imager, a thermal imager, and a multispectral sensor. The first real-world environment 18 may be any setting in the real-world, including but not limited to, indoors, outdoors, on the land, on the sea, underwater, in-the-air, and in space.

Figure 3A:
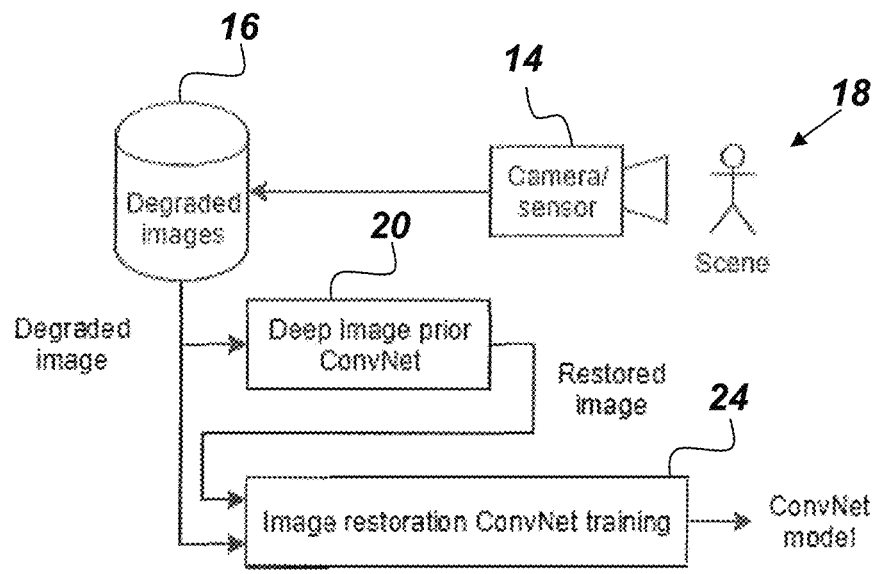
FIG. 3A is an illustration of an image processing system in a training mode.
Figure 3B:
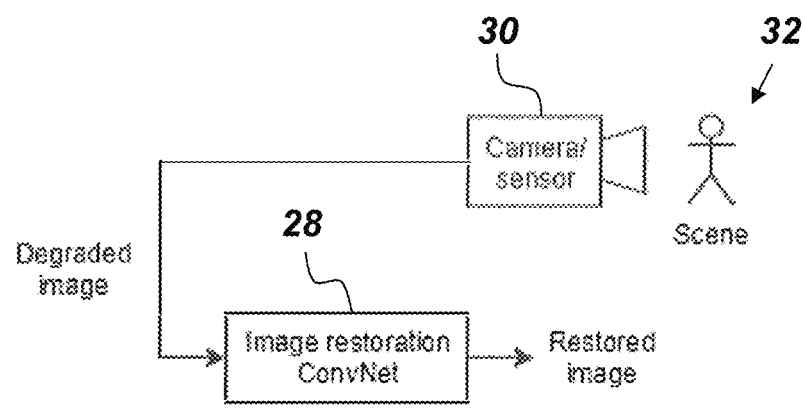
FIG. 3B is an illustration of an image processing system in an inference mode.

FIGS. 3A and 3B are illustrations of the training and inference phases respectively of an embodiment of the system 12 for implementing the image processing method 10. FIGS. 3A and 3B summarize the workflow of the image processing method 10, which uses the Deep Prior Approach in an offline setting, during the training phase, to generate a large collection of degraded and restored training examples without incurring an efficiency penalty during the inference phase. The first sensor 14, in this embodiment, is a camera configured to capture a large collection of degraded images (e.g., degraded images 16 shown in FIG. 3A), which will then be passed through the untrained ConvNet 20, which is configured to use the Deep Image Prior approach to produce best-guess estimates of underlying clean images; thereby creating a complete dataset of paired training examples (i.e., the plurality of degraded/clean image pairs 24) targeted to the application domain and sensor. The image processing method 10 then uses this dataset to train the machine learning model 28, which in the example embodiment shown in FIG. 3B, is a ConvNet with the architecture, loss function, and hyper parameters that are specifically optimized for an appropriate tradeoff between image quality and efficiency. Once the machine learning model 28 (e.g., ConvNet in this embodiment) is appropriately trained, it can be deployed along with the second sensor 30 in the inference phase and used to enhance degraded images and videos. The second sensor 30 in some embodiments can be the same sensor as used in the training phase or similar sensors to the sensor used in the training phase.

The image processing method 10 can be used in a number of different ways. For instance, the image processing method 10 can be used to create custom enhancement/restoration solutions tailored to different sensor domains and use-cases. Similarly, the image processing method 10 can also be used to continually adapt an installed system to cope with sensor degradations and environmental conditions (weather/climate/visibility). The image processing method 10 is not limited to use on static scenes, but instead may be used in scenarios with moving foreground or background objects. Further, the image processing method 10 may be used in scenarios where the lighting and shadows in the real-world environment vary. This capability, enables the image processing method 10 to effectively restore images of outdoor natural scenes, including scenes with dynamic lighting and motion.

The second sensor 30 may be any sensor capable of digitally representing a real-world environment. In some embodiments of the system 12, the second sensor 30 is the same sensor as the sensor used to gather initial degraded images (i.e., the first sensor 14). In other embodiments, the second sensor 30 is a separate sensor. It is preferable that the second sensor 30 be the same as, or similar to, the first sensor 14. Suitable examples of the second sensor 30 include, but are not limited to, a video camera, a still image camera, a sonar imager, a thermal imager, and a multispectral sensor. The first and second real world environments may be the same environment just imaged at different times. It is preferable that the first and second real world environments are as similar as possible, but it is not required. In embodiments where the second sensor 30 is a video camera, it is desirable, but not required, that the machine learning model is a second ConvNet configured to convert live-streaming video images from the second sensor 30 into a restored video stream in real time based on the learned function.

The machine learning model 28 may be any machine learning model that can be trained to learn a function that converts degraded images into restored images. A preferable example of the machine learning model 28 is a ConvNet, but it is to be understood that the machine learning model 28 is not limited to ConvNets. The machine learning model 28 may be chosen to optimize whatever objectives are most important in a given deployed system 12. Example objectives include, but are not limited to, speed, efficient resource utilization, and better restoration of fine details. Depending on the objective(s), the design/architecture of the machine learning model 28 may be altered according to the knowledge and experience of those having ordinary knowledge in the field of machine learning models. The machine learning model may be trained, via the supervised learning approach, to learn the function for converting degraded images into restored images based on the plurality of degraded/clean image pairs and a plurality of curated pairs of clean and degraded images.

The image processing method 10 may be repeated so as to continually adapt to sensor degradations and changing environmental conditions. For example, the image processing method 10 may be repeated at different times of day, under different lighting conditions, in different seasons, or even different locations. For example, in one operational embodiment, the first sensor 14 is initially located in City A during the training phase, but is subsequently moved to a similar City B for the inference phase. Since the two cities are similar, even though the image processing system 12 was initially trained in City A, the image processing method 10 will work in City B. Then later, as the image processing method 10 repeats itself in City B, the image restoration performance of the system 12 will improve. Continually repeating the steps of the image processing method 10 also enables the system 12 to compensate for fog, smoke, poor lighting, dirty lens, sensor degradation, and electromagnetic interference.

From the above description of the image processing system 12 and method 10, it is manifest that various techniques may be used for implementing the concepts of the image processing system 12 and method 10 without departing from the scope of the claims. The described embodiments are to be considered in all respects as illustrative and not restrictive. The method/apparatus disclosed herein may be practiced in the absence of any element that is not specifically claimed and/or disclosed herein. It should also be understood that the image processing system 12 and method 10 are not limited to the particular embodiments described herein, but are capable of many embodiments without departing from the scope of the claims.

We claim:

1. A method for processing images comprising:
    capturing a plurality of degraded images of a first real-world environment with a first sensor;
    processing each degraded image with a first, untrained convolutional neural network, via a Deep Image Prior approach, to obtain a plurality of clean images, wherein each degraded image is processed based only on itself without reference to any other image such that its corresponding clean image is obtained without any other input or training, wherein each clean image corresponds to a single degraded image;
    pairing each clean image with its corresponding degraded image to create a plurality of degraded/clean image pairs;
    training, via a supervised learning approach, a machine learning model to learn a function for converting degraded images into restored images based on the plurality of degraded/clean image pairs;
    capturing a second plurality of degraded images of a second real-world environment; and
    using the trained machine learning model to convert the second plurality of degraded images into restored images based on the learned function.

2. The method of claim 1, wherein the step of capturing the second plurality of degraded images is performed by the first sensor.

3. The method of claim 2, wherein the first sensor is a video camera and wherein the trained machine learning model is a second convolutional neural network configure to convert live-streaming video images from the first sensor into a restored video stream in real time based on the learned function.

4. The method of claim 2, wherein the first sensor is selected from a group consisting of a still-image camera, a sonar imager, a thermal imager, and a multispectral sensor.

5. The method of claim 1, wherein the step of capturing the second plurality of degraded images is performed by a second sensor.

6. The method of claim 5, wherein the second sensor is a video camera and wherein the trained machine learning model is configured to convert live-streaming video images from the second sensor into a restored video stream in real time based on the learned function.

7. The method of claim 6, wherein the first and second sensors are thermal imagers.

8. The method of claim 6, wherein the first and second sensors are multispectral sensors.

9. The method of claim 1, further comprising continually repeating the steps of claim 1, wherein all the degraded/clean image pairs created in accordance with claim 1 are used to train the machine learning model so as to continually adapt to sensor degradations and changing environmental conditions.

10. The method of claim 1, wherein the second real-world environment is at a same location as the first real-world environment but at a later point in time.

11. The method of claim 1, further comprising repeating the steps of claim 1 at different times of day and in different seasons, wherein all the degraded/clean image pairs created in accordance with claim 1 are used to train the machine learning model.

12. The method of claim 1, wherein the Deep Image Prior approach is characterized by:

$$\theta^* = \mathrm{argmin} E(f_\theta(z); x_0), \ x^* = f_{\theta^*}(z)$$

where f is a learned function, θ is a random initialization of network parameters, θ* is a local minimizer obtained using gradient descent, $E(f_\theta(z); x_0)$ is a task-specific data term, $x_0$ is a given degraded image; x* is a corresponding restored image, and z is a randomly-initialized three-dimensional tensor.

13. The method of claim 1, wherein the trained machine learning model is a convolutional neural network configured to convert the second plurality of degraded images into restored images based on the learned function in real time.

14. A system for processing images in real time comprising:
    a first sensor configured to capture a plurality of degraded images of a real-world environment;
    a first computer processor communicatively coupled to the first sensor, wherein the first computer processor comprises a convolutional neural network configured to process each of the degraded images, via a Deep Image Prior approach, to obtain a plurality of clean images, wherein each clean image corresponds to a single degraded image, such that each clean image is paired with its corresponding degraded image to create a plurality of degraded/clean image pairs;

a second computer processor comprising a machine learning model that has been trained, via a supervised learning approach, to learn a function for converting degraded images into restored images based on the plurality of degraded/clean image pairs; and wherein the first sensor is communicatively coupled to the second computer processor and configured to capture a second plurality of degraded images of a second real-world environment, wherein the machine learning model is configured to convert the second plurality of degraded images into restored images based on the learned function.

15. The system of claim 14, wherein the machine learning model of the second computer processor is a convolutional neural network.

16. The system of claim 14, wherein the Deep Image Prior approach comprises:

initializing the convolutional neural network with random weights to enhance a given degraded image;

using the convolutional neural network's structure as an image prior; and performing denoising, super-resolution, and inpainting operations on the given degraded image based only on the image prior without any other input or training.

17. The system of claim 16, wherein the Deep Prior Approach comprises:

initializing the convolutional neural network with a combination of learned weights and random weights to enhance a given degraded image;

using the convolutional neural network's structure as an image prior; and performing denoising, super-resolution, and inpainting operations on the given degraded image based only on the image prior without any other input or training.

18. The system of claim 14, wherein the Deep Image Prior approach is characterized by:

$$\theta^* = \arg\min E(f_\theta(z); x_0), \; x^* = f_{\theta^*}(z)$$

where f is a learned function, $\theta$ is a random initialization of network parameters, $\theta^*$ is a local minimizer obtained using gradient descent, $E(f_\theta(z); x_0)$ is a task-specific data term, $x_0$ is a given degraded image; $x^*$ is a corresponding restored image, and z is a randomly-initialized three-dimensional tensor.

19. The system of claim 14, wherein the machine learning model is trained, via the supervised learning approach, to learn the function for converting degraded images into restored images based on the plurality of degraded/clean image pairs and a plurality of curated pairs of clean and degraded images.

20. The system of claim 14, wherein the machine learning model is configured to convert the second plurality of degraded images into restored images based on the learned function in real time.

* * * * *